Figure 1A:
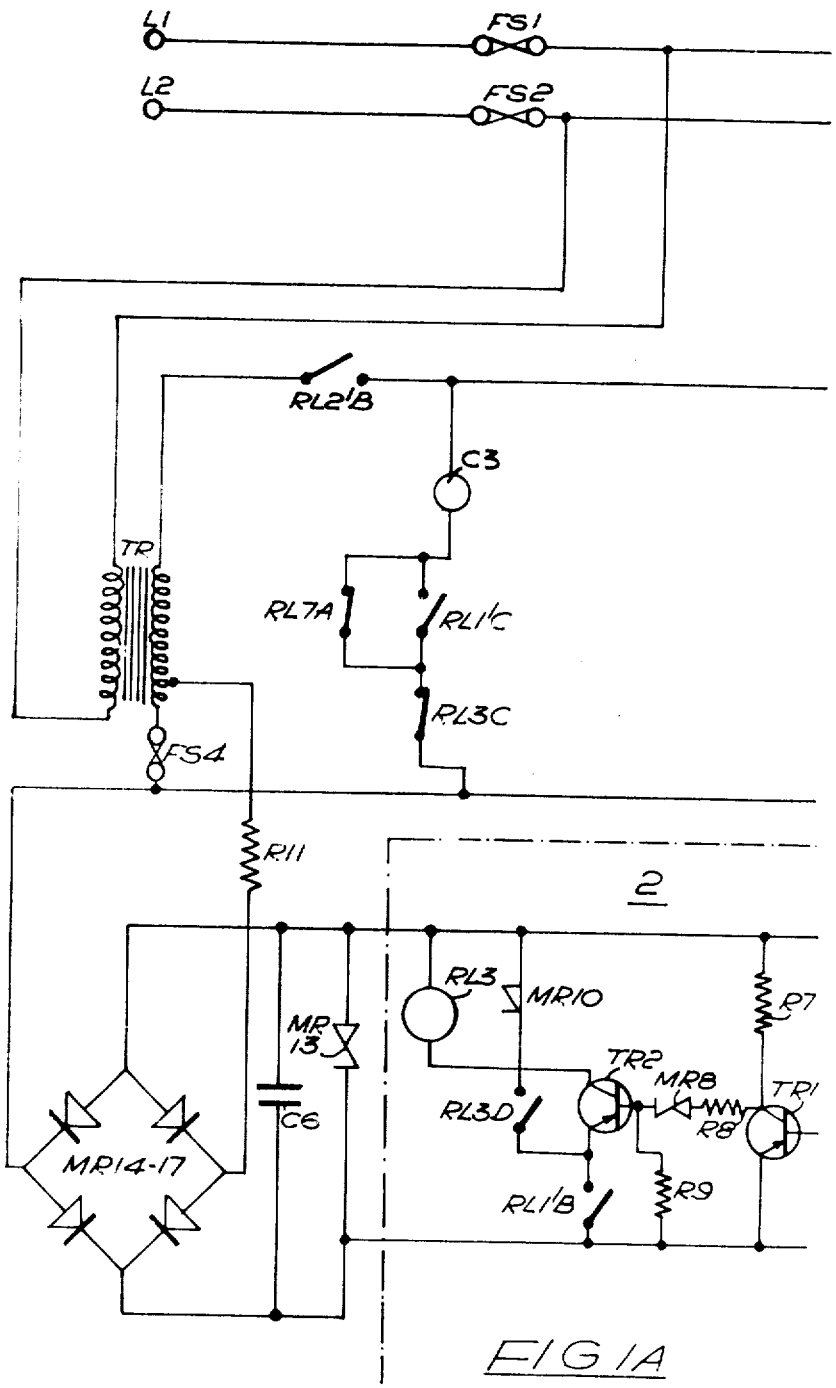

United States Patent

Davey

[15] 3,673,482
[45] June 27, 1972

[54] AUTOMATICALLY OPERATING AND CONTROLLING RECIPROCATING MOTION

[72] Inventor: Anthony Walter Davey, Hathern, England

[73] Assignee: Herbert Morris Limited, Loughborough, Leicester, England

[22] Filed: March 5, 1971

[21] Appl. No.: 121,337

[30] Foreign Application Priority Data

March 12, 1970 Great Britain ..................... 11,816/70

[52] U.S. Cl. ............................................. 318/266, 318/467
[51] Int. Cl. ..................................................... H02p 7/36
[58] Field of Search ................. 318/135, 264, 265, 266, 466, 318/467, 468, 626, 687

[56] References Cited

UNITED STATES PATENTS

| | | | |
|---|---|---|---|
| 3,039,764 | 6/1962 | Heinsman et al. | 318/468 X |
| 3,462,883 | 8/1969 | Reeks et al. | 318/687 X |

*Primary Examiner*—Bernard A. Gilheany
*Assistant Examiner*—W. E. Duncanson, Jr.
*Attorney*—Norris & Bateman

[57] ABSTRACT

A linear induction motor for automatically operating a reciprocating member or door incorporating a control system for the motor by which the door is accelerated at full thrust to travelling speed, means for reducing the motor thrust to enable the door to coast at approximately constant speed until reaching a limit switch which initiates reverse thrust braking, with means to automatically cut out the braking as soon as the door has stopped and means for driving the door at low thrust to a final limit switch, an overspeed relay for initiating the reversal of the motor thrust when the door speed exceeds a predetermined value.

6 Claims, 3 Drawing Figures

INVENTOR
ANTHONY WALTER DAVEY

BY Norris & Bateman
NORRIS & BATEMAN

AUTOMATICALLY OPERATING AND CONTROLLING RECIPROCATING MOTION

This invention relates to improvements in means for automatically operating and controlling the speed and terminal stopping positions of an object which requires to be reciprocated between predetermined positions and in particular to sliding doors for lifts and is an improvement in or modification of the invention described in the Specification of our U.S. Pat. No. 3,462,883 dated Aug. 26, 1969.

Specification, U.S. Pat. No. 3,462,883 described apparatus for operating a reciprocating member comprising a linear induction motor having one member mounted on the member and a second member mounted on a stationary framework, means for energizing the motor to operate said reciprocating member in either direction, a series of switches on the framework actuated by the reciprocating member during travel thereof, means responsive to the actuation of one switch for applying reverse power to the motor to decelerate the reciprocating member, speed responsive means operated by movement of the reciprocating member for generating a signal proportional to the linear speed of the reciprocating member and means responsive to such signal for terminating the application of reverse power to the motor when the speed of said reciprocating member has decreased to a predetermined value.

According to the invention a control system for the motor comprises a control system in which the door is accelerated at full thrust to travelling speed, means for reducing the motor thrust to enable the door to coast at approximately constant speed until reaching a limit switch to initiate reverse thrust braking, means to automatically cut out the braking as soon as the door has stopped, and means for driving the door at low thrust to a final limit switch and an over speed relay for initiating the reversal of the motor thrust when the door speed exceeds a predetermined value.

Figure 1B:
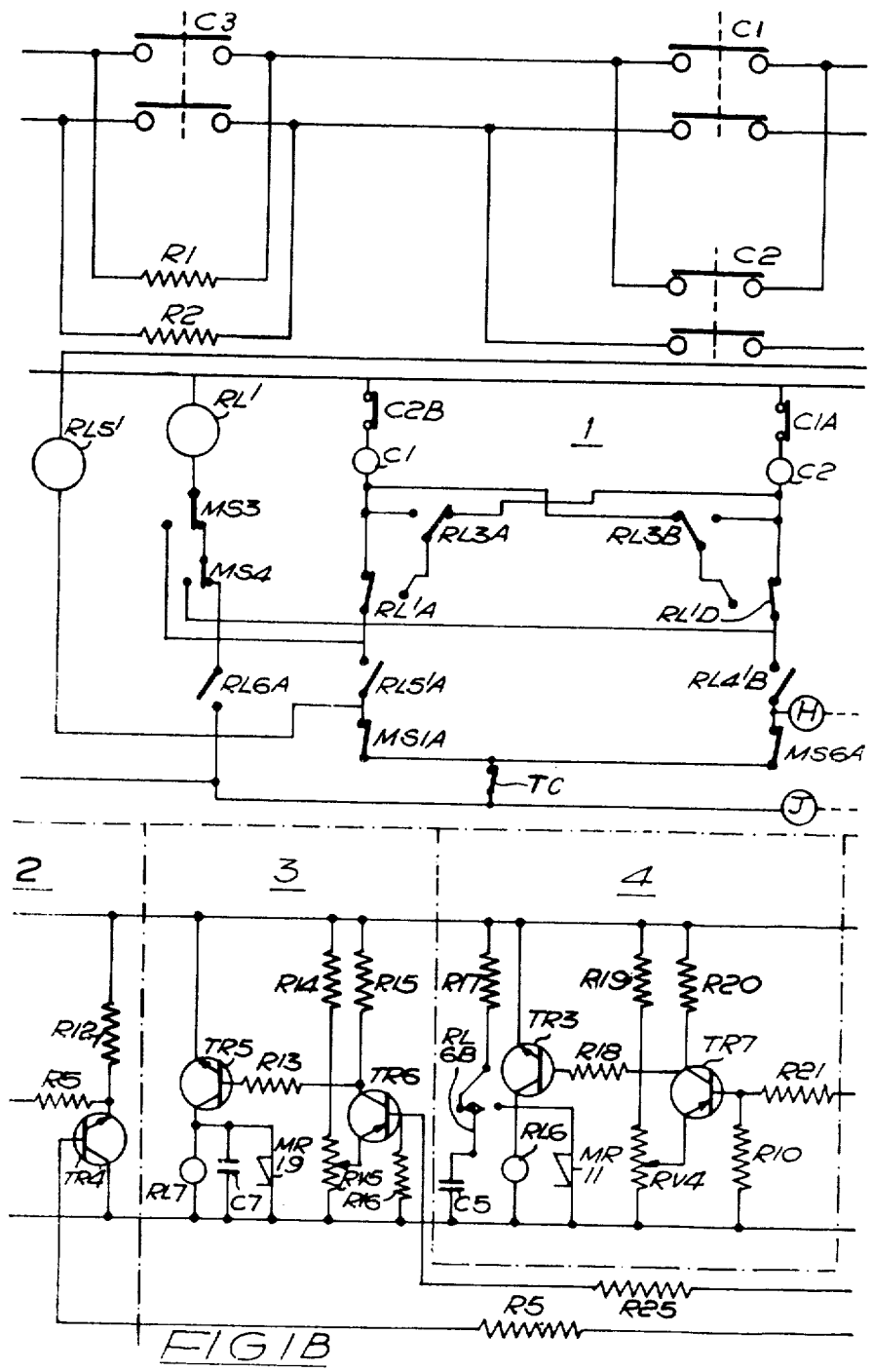
Figure 1C:
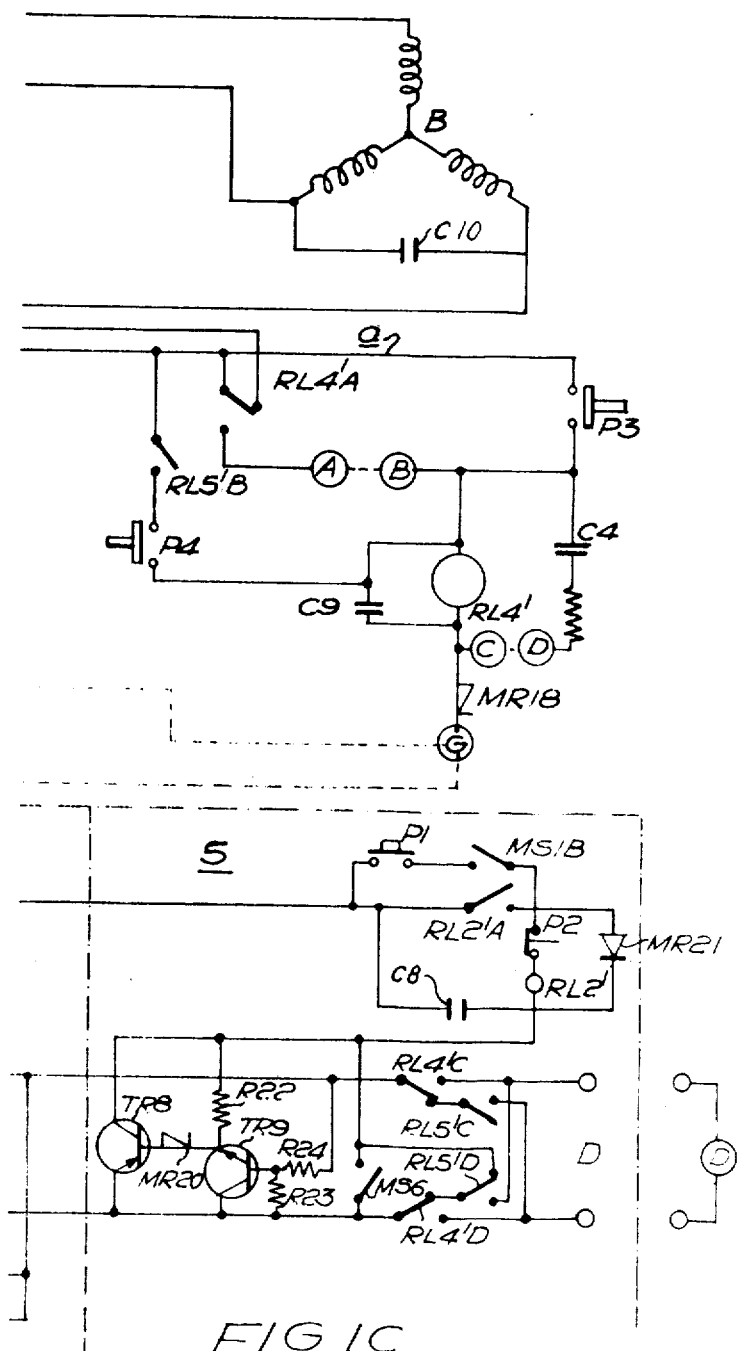

The invention will be described with reference to the accompanying drawings in which:

FIGS. 1A, 1B and 1C show circuit diagrams (Fg. 1B and 1C being continuations of FIG. 1A) of the circuits for controlling the starting of the motor, acceleration to full thrust travelling speed, reduction of the motor thrust to enable the door to travel at substantially constant speed, automatic braking, driving the door at low thrust to a stop and for initiating reversal of the motor thrust when the door exceeds a predetermined value or on meeting an obstruction.

The circuit is shown operating from a single phase supply to a three phase motor B as is well known by the addition of a capacitor C10 and the change of direction by the connection to either one side of the capacitor or the other.

The reverse braking relays RL1 and RL2 of Specification, U.S. Pat. No. 3,462,883 each separately operated from their respective limit switches MS3 and MS4 have been amalgamated in a single relay $RL_1^1$. The motor is fed from a line $L_1$, $L_2$ through fuses $FS_1$ and $FS_2$.

Two further relays $RL4^1$ and $RL5^1$ are introduced, one contact on relay $RL4^1$ replacing Y and a contact on relay $RL5^1$ on the second relay replacing X. These relays are included so that impulse operation is possible when a short duration signal only is received to operate the door, such as when used with photo cells or in lifts. The two relays RL4 and RL5 have hold-on contacts so that they will retain until the desired motion has taken place.

With these relays has been retained the feature of the door edge switch which operates relay $RL4^1$ this relay $RL4^1$ having a capacitor to give a timed hold open, which was previously carried out by relay RL5 and capacitor C4.

The acceleration carried out at high thrust was controlled by the limit switches MS2 and MS5, these have now been deleted and the high thrust is now controlled from the tachogenerator, the acceleration will continue until the correct speed is attained when the relay RL7 will operate to reduce the thrust, the relay RL7 contact replacing switches MS2 and MS5.

The transistor circuit has been adapted to silicon type transistors, as against the original germanium, which has resulted in the removal of the bias line supplied by the rectifier MR12 feeding resistances R6, R9, R10. Also the higher base voltage required to drive the silicon transistors results in an additional transistor stage in the relay RL3 circuit.

The overspeed relay drive circuit 4 has been modified and an extra transistor stage added to make it similar to the new stage for terminating the acceleration and to make adjustments easier.

A new feature is the tacho voltage failure safety circuit 5 which prevents the motor from damage should the door be stalled by an obstruction or shuts off the door in the event of a tachogenerator failing to function. It may also be used as an ON-OFF control, operation of push button P1 will activate the unit, operation of P2 will de-activate the unit.

The tachogenerator D circuit has been simplified and the bridge rectifier unit MR1-6 has been deleted, a DC tachogenerator D now being used to produce the DC directly.

The control circuit operates as follows:

When opening is required an initiation contact P3 energizes relay $RL4^1$ which has four contacts, one contact $RL4^1A$ disconnects the closing relay from the supply line.

A second contact $RL4^1B$ energizes contactor C2, which applies power to the motor in the correct direction.

Further contacts $RL4^1C$ and $RL4^1D$ connect the tachogenerator D output terminals to the electronic control circuitry.

The motor will accelerate the door and at the preset speed set by a potentiometer RV5 and a relay RL7 which has one contact will operate.

This relay by means of its contact RL7a de-energizes the contactor C3, which in turn by means of opening its contacts, reduces the thrust of the motor by connecting the resistors R1 and R2 in the motor leads.

The door now travels at a substantially constant speed; should the speed fall, due to excess frictional resistance the tacho voltage will fall and the relay RL7 will de-energize. This will cause the contactor C3 to energize via the relay contact RL7A and the resistors in the motor leads R1, and R2 will again be by-passed to increase the motor thrust and overcome the excess frictional resistance of the motor.

Should the door for any reason exceed an upper speed limit set by a potentiometer RV4 the tachogenerator voltage will cause relay RL6 to energize.

The contact RL6A will on closing energize the relay RL1 which will reverse the motor via one of its contacts RL1D de-energizing contactor C2 and energizing contactor C1, thus reversing the motor connections.

The relay RL6 will de-energize directly the speed falls below the upper set limit, a slight damping of the relay RL6 being cuased by the capacitor C5 charged by a resistor R17 which is connected across the relay RL6 coil by contact RL6B. This is to prevent very rapid operation the reversing Contactors C1 and C2. A further contact of the single relay ensures that the contactor C3 operates to give full power to the braking action.

Just before the position of completely open, a limit switch MS4 is operated. This will energize the relay $RL_1^1$, similarly as for overspeed, though in this case the braking action is maintained below the upper speed limit.

The braking action will remain on at full power until the door has stopped, this is determined by the relay RL3. The relay RL3 will not operate until the tachogenerator voltage is substantially zero, allowing the transistor TR2 to conduct. When the relay RL3 operates a hold-on contact RL3D maintains the relay and contacts RL3A and RL3B reverse the contactors C1 and C2 to power the door in the opening direction and contact RL3C ensures that this is at low power to prevent bumping.

On completion of the opening sequence, the limit switch MS6 opens and de-energizes the contactor C1 and the Relay $RL4^1$ and the Relay $RL_1^1$.

One contact RL1B of the relay RL1 then de-energizes the relay RL3, this contact also prevents the relay RL3 operating during the initial period when the door is stationary.

The closing sequence is similar, except that the relay RL5¹ is energized in place of the relay RL4¹; the limit switch MS3 initiates the reverse braking and the limit switch MS1 shuts off the motor at the final limit.

Protection circuits 5 are included and consisting of a relay RL2¹ which is initiated by a reset button P1. This relay is held on by means of contact RL4¹D and contact RL5¹D until a direction is selected, when one of these contacts will operate; a contact RL2¹A to maintain the signal when the reset push button P1 is released.

A capacitor C8 will hold the relay RL2¹ on until the feed to the coil of the relay RL2¹ is re-initiated by a transistor TR8 which is turned on by the voltage generated by the tachogenerator.

Should the tachogenerator fail or the door stall, the capacitor C8 will quickly discharge through the relay RL2¹ and the relay will de-energize, a contact thereof RL2¹B de-energizing the contactors C1, C2 and C3 releasing all power from the motor.

The relay RL2¹ may then be reset by operating the push button P1, when the relays RL4 and RL5 are off, or the door is in the closed position.

Various configurations of the operating circuit are possible, for footmat switch operation, when the door will open if a passenger is standing on the mat which continues under the door with only two terminals G, J linked.

When the footmat switch is operated the relay RL4¹ is energized via the mat switch and the link G, J. When the mat is clear, the switch opens, de-energizes the relay RL4¹ and contact RL4¹A and energized the relay RL5¹ to reclose the door.

If impulse operation is required where the open switch is only momentarily closed, such as when operated by someone breaking the beam of a photo cell unit when passing, two terminals A and B are linked and the terminal G is linked to a further terminal H. The relay RL4 will then retain itself after the impulse via a contact RL4¹A. The door will then start to close again when the final open limit switch MS6 is operated. If a delay in the open condition is required, further terminals C, D are also linked, the relay RL4¹ will then be held on by the energy stored in the capacitor C4, after the final open limit switch MS 6 is operated. When the capacitor C4 is discharged the relay RL4¹ will de-energize energizing the relay RL5¹ as before described.

When the door is closing, should a door edge safety switch P4 be operated, the relay RL4¹ will be energized, one contact RL4¹A de-energizing the relay RL5¹ and hence the closing contactor C1. A contact RL4¹B of the relay RL4¹ will energize the open contactor C2 and due to the reversing of the tachogenerator connection via further contacts RL4¹C and RL4¹D the relay RL7 will de-energize to energize contactor C3 via a contact RL7A. This will give full power reverse braking until the door reverses, when the relay RL7 will re-energize to reduce the motor thrust as soon as correct speed is obtained.

The resistors R1 and R2 may be replaced by chokes or a transformer, when the extra cost involved can be offset against the power consumption lost in the resistors, together with a lower temperature rise within the equipment.

The electronic detector circuits may be divided into power supply 1, reverse braking circuit 2, door minimum speed circuit 3, overspeed circuit 4 and fail safe circuits 5.

The operation of these circuits is as follows:

The 12v. DC power supply to the transistor circuits is derived from the low voltage tapping on the transformer TR, it is rectified by the rectifier bridge MR14–17 and stabilized with the zener diode MR13 and ballast resistor R11 (circuit 1).

The reverse braking circuit 2 will operate when the tachogenerator output voltage applied to the base of transistor TR4 falls to zero via resistor R5 and hence the voltage at the emitter. This will allow the transistor TR1 to turn off, the voltage at its collector rising until it exceeds the zener voltage of MR8, base current then flows through the transistor TR2 the Resistors R7 and R8 and zener diode MR8 energizing the relay RL3; diode MR10 when contacts RL3D are closed is to protect transistor TR2 from the inductive voltage induced when transistor TR2 is turned off.

Whilst the door is in motion transistor TR4 is not fully conducting and can be considered an emitter follower, current then flows through the base of transistor TR1 and resistors R5 and R12, causing transistor TR1 to conduct.

The voltage at the collector of transistor TR1 is below that of the zener diode MR8 and the base of transistor TR2 is held off via resistor R9.

The minimum speed circuit 3 operates as follows:

Transistor TR6 will conduct when the tachogenerator voltage fed to the base via resistor R25 exceeds that set by the potentiometer RV5 and R14, current will then flow through resistor R15, the voltage across R15 will then cause base current to flow in transistor TR5 through resistor R13.

Transistor TR5 will then conduct energizing the relay RL7; a diode MR19 will prevent damage to transistor TR5 by the inductive voltage induced when transistor TR5 de-energizes. Capacitor C7 damps the relay RL7 to prevent rapid oscillation. Resistor R16 is for bias purposes.

The overspeed circuit 4 operates as follows:

The tacho input voltage is fed to the base of transistor TR7 via base feed resistor R21. The overspeed setting is by the bias of transistor TR7 and the overspeed circuit will operate when the tacho voltage fed to the base of transistor TR7 exceeds the emitter bias on transistor TR7 derived from R19 and RV4 in conjunction with R10.

When transistor TR7 conducts the voltage across its collector load R20 is fed to the base of transistor TR3 via resistor R18, causing transistor TR3 to conduct, the relay RL6 will thus energize and capacitor C5 is connected across the relay RL6 by means of contact RL6B.

Capacitor C5 has previously been charged by resistor R17 and damps relay RL6, such that rapid operation is eliminated. A rectifier MR11 prevents damage to the transistor TR3 from the induced voltage of relay RL6 on de-energization.

The thermal cut out T.C. is incorporated within the motor to switch off the door by means of de-energizing the contactors C1 or C2 in the event of the motor overheating. Micro switches MS1 and MS6 contacts A., are the final limit switches for each direction of travel.

MS1 contact B is to ensure that the re-set (start) can only be operated when the door is closed to prevent it closing on someone should the button P1 be operated.

MS6 contact B is to ensure that the fail safe circuit does not operate whilst standing in the open position when relay RL4 remains energized by delay capacitor C4.

The fail safe circuit 5 operates as follows:

When the reset button P1 is pressed the relay R2¹ is energized by the current passing through the closed final switch contact MS1B and the contact RL4¹D and RL5¹D one contact RL2¹A maintaining the circuit when the re-set button P1 is released.

When either of the relays RL4¹ and RL5¹ is operated to induce motion the circuit energizing the relay RL2¹ is broken and the energy stored in the capacitor C8 maintains the relay RL2¹ while the door accelerates.

The voltage from tachogenerator is fed to a transistor TR9 base via a resistor R24, the emitter follows this voltage and thereby causes base current to flow in the transistor TR8 through a diode MR20 and resistor R22.

The transistor TR8 will then conduct and complete the circuit to maintain the relay RL2¹ and to recharge the capacitor C8.

If the tachogenerator fails or the door stalls due to an obstruction, the transistor TR9 base voltage will fall to zero and a resistor R23 holds the transistor TR9 fully on.

The emitter voltage will then be less than the forward drop of the diode MR20 and the transistor TR8 will cease conducting, detenergizing the relay RL2¹ which will drop out when the capacitor C8 discharges.

When the door is operating with impulse signals only and the door is held open for a time determined by the capacitor C4, the relay RL4¹ will be energized for a time when the door is in the fully open condition. To prevent the fail safe current operating under this condition a contact in the final open limit switch MS6B is required to maintain the relay RL2¹.

For three phase operation the control is identical, but the motor circuit is slightly re-arranged.

What I claim is:

1. A linear induction motor for automatically operating a reciprocating door the invention comprising a control system for the motor by which the door is accelerated at full thrust to travelling speed, means for reducing the motor thrust to enable the door to coast at approximately constant speed, a limit switch to initiate reverse thrust braking, means to automatically cut out the braking as soon as the door has stopped, means for driving the door at low thrust, a final limit switch for limiting the movement of the door at low thrust and an overspeed relay for initiating the reversal of the motor thrust when the door speed exceeds a predetermined value.

2. A linear induction motor as in claim 1 in which the control for the motor comprises an electronic detector circuit divided into a power supply circuit, a reverse braking circuit, a door minimum speed circuit, an over speed circuit and a fail to safety circuit.

3. A linear induction motor as in claim 1 and including a tachometer generator which if the door speed exceeds a predetermined value initiates a reversal of the motor contacts to apply reverse thrust braking.

4. A linear induction motor as in claim 1 including a door edge safety switch, and a relay energized thereby to initiate the opening of the motor contactor and the reversing of the tachometer generator to apply reverse thrust braking.

5. A linear induction motor as in claim 1 incorporating a safety circuit to prevent the motor from damage if the door is stalled by an obstruction or in the event of a failure of the tachometer generator.

6. A linear induction motor as in claim 1 incorporating a tachometer generator, a circuit switch, a relay energized by the switch to initiate the reversal of the motor and tachometer generator contacts to apply reverse motor thrust for braking purposes and speed causing means for determining the instant for cutting off the decellerating power.

* * * * *